US011314866B2

(12) United States Patent
Brown et al.

(10) Patent No.: US 11,314,866 B2
(45) Date of Patent: Apr. 26, 2022

(54) SYSTEM AND METHOD FOR RUNTIME FIRMWARE VERIFICATION, RECOVERY, AND REPAIR IN AN INFORMATION HANDLING SYSTEM

(71) Applicant: DELL PRODUCTS, LP, Round Rock, TX (US)

(72) Inventors: Michael E. Brown, Austin, TX (US); Nagendra Varma Totakura, Round Rock, TX (US); Vasanth Venkataramanappa, Austin, TX (US); Senthil Kumar, V, Bangalore (IN); Prashanth Giri, Round Rock, TX (US)

(73) Assignee: Dell Products L.P., Round Rock, TX (US)

(*) Notice: Subject to any disclaimer, the term of this patent is extended or adjusted under 35 U.S.C. 154(b) by 200 days.

(21) Appl. No.: 16/694,057

(22) Filed: Nov. 25, 2019

(65) Prior Publication Data

US 2021/0157921 A1 May 27, 2021

(51) Int. Cl.
*G06F 15/177* (2006.01)
*G06F 9/00* (2006.01)
*G06F 21/57* (2013.01)
*G06F 11/14* (2006.01)
*H04L 9/06* (2006.01)
*G06F 9/4401* (2018.01)
*G06F 8/61* (2018.01)

(52) U.S. Cl.
CPC .............. *G06F 21/572* (2013.01); *G06F 8/63* (2013.01); *G06F 9/4401* (2013.01); *G06F 11/1451* (2013.01); *H04L 9/0643* (2013.01)

(58) Field of Classification Search
CPC .. G06F 21/572; G06F 11/1451; G06F 9/4401; G06F 8/63; H04L 9/0643
See application file for complete search history.

(56) References Cited

U.S. PATENT DOCUMENTS

| | | | |
|---|---|---|---|
| 9,921,915 B2 | 3/2018 | Hung | |
| 2012/0110378 A1* | 5/2012 | Fan | G06F 11/1658 714/15 |
| 2013/0166893 A1* | 6/2013 | Dusija | G06F 8/654 713/2 |
| 2015/0363248 A1* | 12/2015 | D'Abreu | G06F 11/0751 714/37 |
| 2018/0075241 A1* | 3/2018 | Gomez | G06F 21/575 |
| 2018/0276385 A1 | 9/2018 | Heck et al. | |
| 2020/0201617 A1* | 6/2020 | Park | G06F 3/0614 |
| 2021/0050068 A1* | 2/2021 | Schat | G06F 11/1068 |

* cited by examiner

*Primary Examiner* — Xuxing Chen
(74) *Attorney, Agent, or Firm* — Larson Newman, LLP (57) ABSTRACT

A management system for an information handling system includes a memory device and a management controller. The memory device includes a primary firmware image and a backup firmware image. The management controller boots the management system. The boot of the management system includes a read of a first block at an offset within the primary firmware image. The management controller further determines that the read of the first block had a first read error, and reboots the management system in response to determining that the read of the first block had the first read error. The reboot of the management system includes a read of a second block at the offset within the backup firmware image.

18 Claims, 4 Drawing Sheets

SYSTEM AND METHOD FOR RUNTIME FIRMWARE VERIFICATION, RECOVERY, AND REPAIR IN AN INFORMATION HANDLING SYSTEM

FIELD OF THE DISCLOSURE

This disclosure generally relates to information handling systems, and more particularly relates to runtime firmware verification, recovery, and repair in an information handling system.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

A management system for an information handling system may include a memory device and a management controller. The memory device may include a primary firmware image and a backup firmware image. The management controller may boot the management system. The boot of the management system may include a read of a first block at an offset within the primary firmware image. The management controller may further determine that the read of the first block had a first read error, and reboot the management system in response to determining that the read of the first block had the first read error. The reboot of the management system may include a read of a second block at the offset within the backup firmware image.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
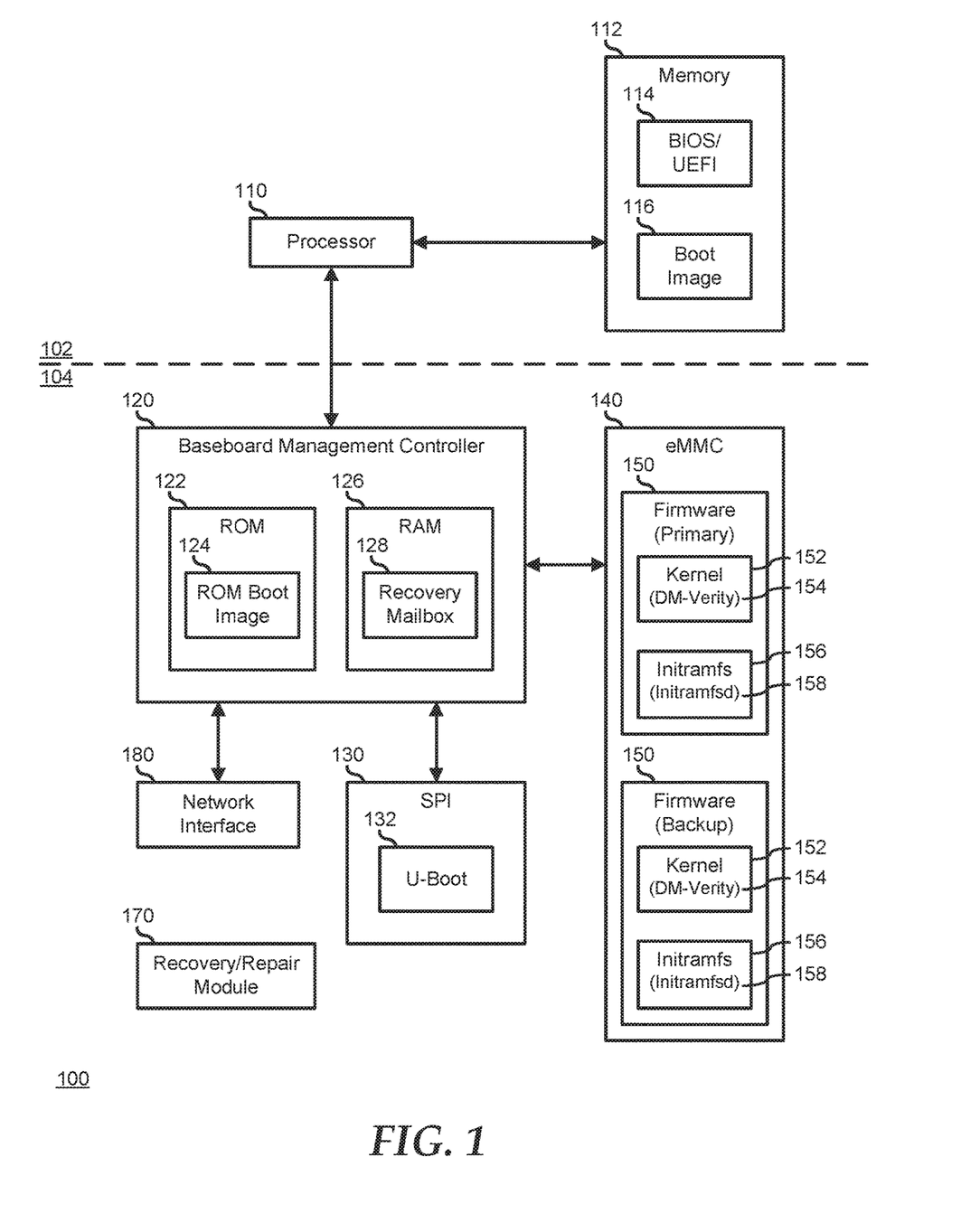
FIG. 1 is a block diagram illustrating an information handling system according to an embodiment of the present disclosure.

FIG. 1 illustrates an information handling system 100 including a host processing system 102 and a management system 104. Host processing system 102 represents hardware, firmware, and software components that are typically associated with a computer or other information handing system, and includes a processor 110 and a memory 112. Processor 110 represents one or more central processing units (CPUs), processor cores, or other processing devices, as needed or desired. Memory 112 represents one or more read-only memory (ROM) or random access memory (RAM) data storage devices of information handling system 100, including various volatile and non-volatile data storage devices such as Dual In-Line Memory Modules (DIMMS), Solid-State Drives (SSDs), disk drives, and the like. Processor 110 operates to execute machine-readable code out of memory 112 to perform the processing tasks of information handling system 100, such as to initialize the information handling system, to run an operating system, and to run application programs, as needed or desired. When host processing system 102 is powered on, processor 110 operates to execute basic input/output system/Universal Extensible Firmware Interface (BIOS/UEFI) code 114 from memory 112 to perform a Power On Self Test (POST), to initialize the components of host processing system 102, and execute a boot loader to load an operating system from boot image 116.

Management system 104 represents one or more processing devices, such as a dedicated baseboard management controller (BMC) System-on-a-Chip (SoC) device, one or more associated memory devices, one or more network interface devices, a complex programmable logic device (CPLD), and the like, that operate together to provide a management environment for information handling system 100. In particular, management system 104 is connected to various components of host processing system 102 via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 100, such as system cooling fans and power supplies. Management system 104 includes network interface device 180 to provide a connection to an external management computer, and the management system can communicate with the management computer to report status information for information handling system 100, to receive BIOS/UEFI or system firmware updates, or to perform other task for managing and controlling the operation of information handling system 100. Management system 104 can operate off of a separate power plane from the components of host processing system 102 so that the management system receives power to manage information handling system 100 when the information handling system is otherwise shut down.

Management system 104 includes a BMC 120, a Serial Peripheral Interface (SPI) device 130, an embedded Multi-Media Card (eMMC) device 140, a firmware recovery and repair module 170, and a network interface device 180. An example of BMC 120 may include a commercially available BMC product or other device that operates in accordance with an Intelligent Platform Management Initiative (IPMI) specification, a Web Services Management (WS-MAN) interface, a Redfish or other Distributed Management Task Force (DMTF) standard, or another managed system standard, such as an Integrated Dell Remote Access Controller (iDRAC), an Embedded Controller (EC), or the like. Management system 104 may include additional memory devices, logic devices, security devices, or the like, as needed or desired. BMC 120 includes a ROM 122 and a RAM 126. ROM 122 includes a ROM boot image 124 that includes code that is the first code executed by BMC 120 upon power up of the BMC, as described further below. RAM 126 includes a recovery mailbox 128, as described further below.

SPI device 130 represents a small flash memory device, typically having a 4-8 megabyte (MB) storage capacity that is accessed by BMC 120 via a SPI interface. SPI device 130 includes Universal Boot Loader (U-Boot) code 132 that includes code to load an operating system for BMC 120, as described further below. eMMC device 140 represents a large capacity non-volatile memory device, typically having 32-64 gigabyte (GB) storage capacity that is accessed by BMC 120 via a MultiMedia Card (MMC) interface. eMMC 140 a primary copy of firmware 150 for management system 104 and a backup copy of firmware 160, as described further below. Primary firmware 150 includes an operating system kernel 152 that includes a device mapper and verification program (DM-Verity) 154. Primary firmware 150 also includes a file system initialization program (initramfs) 156 that includes a daemon associated with the DM-Verity program (dmverityd) 158. In a particular embodiment, backup firmware 160 is a duplicate copy of primary firmware 150. In another embodiment, primary firmware 150 represents a current version of the firmware (that is, version "N"), and backup firmware 160 represents a previous version of the firmware (that is, version "N−1"). Recovery and repair module 170 will be described further below. In either case, backup firmware 160 includes an operating system kernel 162 that includes a DM-Verity 164, and a, initramfs 166 that includes a dmverityd 168.

When BMC 120 is powered on, the BMC is configured to begin executing code from ROM boot image 124. ROM boot image 124 operates to read U-Boot code 132 from SPI device 130, to cryptographically verify the contents of the U-Boot code, to load the U-Boot code to RAM 126, and to pass execution off to the U-Boot code. It will be understood that ROM boot image 124 represents the root of trust for all subsequent operation of management system 102. That is, the authenticity and security of all subsequent operations, and the validity of all other firmware elements of management system 104 is predicated on the fact that ROM boot image 124 has not been tampered with or altered in any way. As such, the content of ROM 122, and particularly the code associated with ROM boot image 124 must only be modified by authorized and authenticated agents. The details of authentication of firmware updates in a management system are known in the art and will not be further disclosed herein, except as needed to describe the present embodiments.

When execution is passed to the U-Boot code stored in RAM 126, the U-Boot code operates to read the contents of primary firmware 150 from eMMC device 140, to cryptographically verify kernel 152 and initramfs 156, to load the kernel and the initramfs to RAM 126, and to pass execution off to the kernel. initramfs 156 mounts a file system associated with eMMC 140, provides a hash tree and Forward Error Correcting (FEC) information for the data stored on the eMMC, and particularly for primary firmware 150 and backup firmware 160, and provides for error correction when a block read results in one or more read errors. DM-Verity 154 verifies the integrity of the blocks that include primary firmware 150 and backup firmware 160 based upon the hash tree. dmverityd 158 is a daemon that monitors the operations of and DM-Verity 154, orchestrates the necessary error corrections by writing indications to recovery mailbox 128 when read errors occur, and reboots management system 104 as necessary to carry out repairs to primary firmware 150, as described further below. Various code is described herein as being located at various memory devices at different times. It should be understood that management system 104 may include other memory devices, and that such code may be stored and executed from other memory devices than those described here, as needed or desired.

It has been understood by the inventors of the present disclosure that firmware corruption is an increasing problem in embedded systems such as management system 104, especially as memory device capacities have increased. Further, because an embedded system such as management system 104 may operate for long durations of time without rebooting, without the runtime detection of firmware corruption, failures in flash memory devices may not be detected in a timely fashion.

In a particular embodiment, one or more of the elements of management system 104 operate to instantiate firmware recovery and repair module 170. For example, the functions and features of recovery and repair module 170 may be provided as a part of one of ROM boot image 124, U-boot code 132, or file system loader 142, or various combinations of the functions and features of the recovery and repair module may be provided by a one or more of the ROM boot image, the U-boot code, or the file system loader, as needed or desired. Recovery and repair module 170 operates to receive indications of failed block reads from dmverityd 158. In particular, DM-Verity operates to verify each block read with a hash value for the particular block to ensure the contents of the block. Here, when DM-Verity 154 detects a failed block read from one or more of SPI device 130 or eMMC device 140, dmverityd 158 determines if the failed block read is associated with a firmware element of management system 104, such as a block associated with file system loader 142, with primary firmware 150, or with backup firmware 160. When a failed block read is associated with a firmware element, dmverityd 158 provides information related to the block read failure to recovery and repair module 170. In a particular embodiment, dmverityd 158 is included with, and runs as an integral part of initramfs 156.

Recovery and repair module 170 operates to mitigate block read errors. In a particular embodiment, where backup firmware 160 is a duplicate copy of primary firmware 150, recovery and repair module 170 operates to direct management system 104 to reboot to the primary firmware 160, to read the block of backup firmware 160 that is the duplicate copy of the block which experienced the block read error in primary firmware 150, and to perform a write process to the block which experienced the block read error, thereby repairing the primary firmware image. In directing management system 104 to reboot to backup firmware 160, recovery and repair module 170 operates to write information identifying the block of primary firmware 150 that experienced the block read error to recovery mailbox 126, so that the information is not lost in the subsequent reboot. Thus, during the reboot, recovery and repair module 170 operates to scan recovery mailbox 126 to determine if any block read failures were detected during prior runtimes of management system 104.

After recovery and repair module 170 writes the block from backup firmware 160 to the associated block of primary firmware 150, the recovery and repair module directs management system 104 to reboot to primary firmware 150, completing the repair. In another embodiment, where primary firmware 150 represents the current version of the firmware (that is, version "N"), and backup firmware 160 represents the previous version of the firmware (that is, version "N−1"), recovery and repair module 170 operates to direct management system 104 to reboot to backup firmware 160, and sends an indication, for example to a management computer connected to network interface 180, that management system 104 is operating on the previous version of the firmware. Here, a service technician can be directed to perform an update of the firmware to bring management system 100 back to the current "N" version of the firmware.

In a particular embodiment, dmverityd 158 operates to open a low-level netlink socket to the operating firmware. Here, dmverityd 158 implements a message filter, examining the message stream produced by DM-Verity 154 to determine if a particular block read error is for a block of primary firmware 150 or a block of backup firmware 160. If such block read error is detected, dmverityd 158 operates to write a message to recovery mailbox 128 indicating, for example the device from which the block read error occurred, and the offset of the block read error.

In addition to writing the information identifying the block of primary firmware 150 that experienced the block read error to recovery mailbox 126, recovery and repair module 170 operates to increment a block read failure counter in the mailbox. Here, recovery and repair module 170 operates, on subsequent boots of management system 104, to determine if the number of block read failures indicated by the block read failure counter exceeds a predetermined threshold. In a particular embodiment, the block read failure counter counts a total number of block read failures from any block. Here, when the number of block read failures indicated by the block read failure counter exceeds the threshold, recovery and repair module 170 operates to provide an indication, for example to a management computer connected to network interface 180, that the number of block read failures exceeds the threshold. Here, a service technician can be sent to information handling system 100 to repair or replace the failing memory device.

In another embodiment, the block read failure counter counts a number of failures associated with each particular failing block. As such, recovery mailbox 126 may store multiple block read failure counters, each associated with a different block. Here, when the number of block read failures indicated by the block read failure counter for a particular block exceeds the threshold, recovery and repair module 170 operates to perform a repair operation for the memory device. The repair operation may include directing the memory device to perform a post-package repair on the failing block or to otherwise remap the failing block to another block of the memory device. The repair operation may also include remapping the failing block to another block of the memory device at the management system 104 level. That is, recovery and repair module 170 can direct the booted operating system of management system 104 to remap block reads to the failing block to a different block.

Recovery and repair module 170 further operates during runtime to provide a patrol read mode for the detection of errors that occur during runtime. Here, for example, dmverityd 158 may operate to periodically read different blocks of primary firmware 150 and backup firmware 160 for eMMC device 140. The patrol read mode provides a mechanism whereby block read errors may be minimized or prevented. Here, it will be understood that a memory device may detect read voltages in the cells of the memory device, and if the read voltage is below a threshold, the memory device may re-write the memory cell to increase the stored voltage, thereby reducing the likelihood of experiencing block read errors in the first instance. Further, when a block read error is detected by DM-Verity 154, dmverityd 158 operates to trigger a recovery operation, as described above.

In a particular embodiment, recovery and repair module 170 operates to provide forward error correction on the data read from a block that experienced a block read failure. Here, each block of information includes a data portion and an error-correcting code portion. The data portion comprises the useable data within the block, while the error-correcting code portion includes additional information utilized to correct a limited number of errors within the block, and to detect greater numbers of errors within the block. The mechanisms for forward error correction and for implementing error-correcting code is known in the art and will not be further disclosed herein except as needed to describe the present embodiments.

In particular, the amount of error-correcting code, as a proportion of either the amount of data, or as a proportion of the size of the block may depend upon the particular algorithm utilized for providing the forward error correction function as described here, and such details may be determined as needed or desired. In general, forward error correction may be implemented on a per-block basis, such as on data blocks of 512 bytes, on a per-erase-block basis, such as on erase blocks of 128 kilobytes (kB), or on different sized of data, as needed or desired. In a particular embodiment, based upon the functioning of the forward error correction algorithm utilized, initramfs 154 can distinguish between correctable block read errors, that is, block read errors with a number of errors that is less than a threshold number of errors, and uncorrectable block read errors, that is, block read errors with a number of errors that is greater than the threshold number of errors.

When a block read error is uncorrectable, recovery and repair module 170 operates to recover in accordance with the methods and functions as described above. On the other hand, when a block read is correctable, recovery and repair module 170 operates to provide information to recovery mailbox 126 indicating that a correctable error occurred, and the block offset for the affected block. Then, when management system 104 is rebooted, instead of booting to backup firmware 160, the management system reboots to primary firmware 150. Then, if a block read error occurs at the same offset, the corrupted block is recovered based upon the forward error correction algorithm, and recovery and repair module 170 writes the repaired block back to the correct offset, and the reboot proceeds. Here, it will be understood that one or more of SPI device 130 and eMMC device 140 are only unlocked for writing during particular limited stages of the boot process. Here, recovery and repair module 170 is invoked at a time when the underlying device is unlocked for rewriting.

Figure 2:
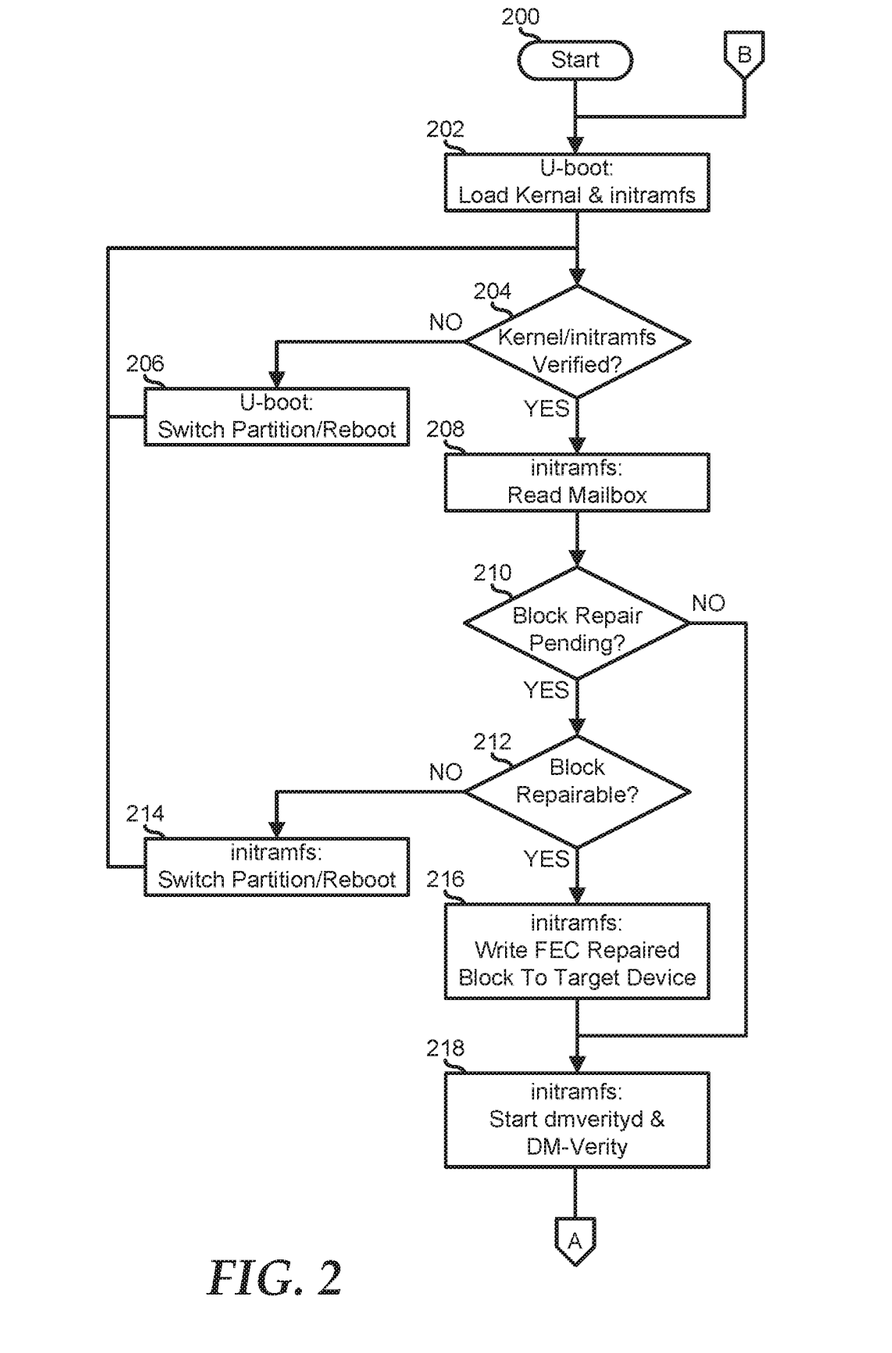
FIGS. 2 and 3 are a flowchart illustrating a method for runtime firmware verification, recovery, and repair in an information handling system according to an embodiment of the present disclosure.
Figure 3:
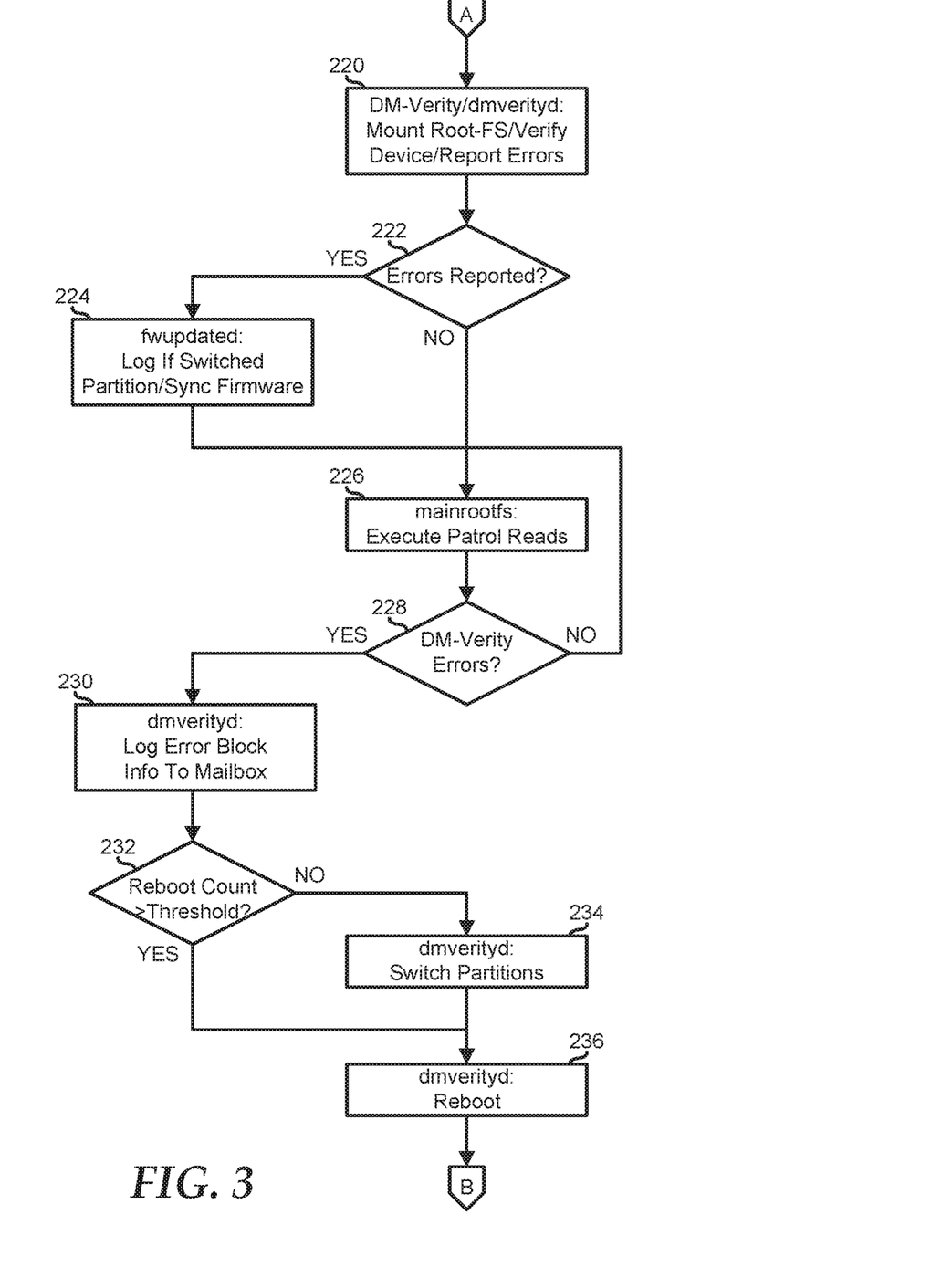

FIGS. 2 and 3 illustrating a method for runtime firmware verification, recovery, and repair in an management system of an information handling system starting at block 200. A U-boot loads a kernel and a file system initialization program (initramfs) in block 202. A decision is made as to whether or not the kernel and initramfs were cryptographically verified to determine if they have been tampered with in decision block 204. If not, the "NO" branch of decision block 204 is taken, the U-boot switches the boot partition and reboots the management system in block 206, and the method loops back to block 204. If the kernel and initramfs were cryptographically verified, the "YES" branch of decision block 204 is taken, and the initramfs reads a recovery mailbox in block 208, and a decision is made as to whether or not a block repair is pending based upon the read of the recovery mailbox in decision block 210. If not, the "NO" branch of decision block 210 is taken and the method proceeds to block 218, as described below.

If a block repair is pending, the "YES" branch of decision block 210 is taken and a decision is made as to whether or not the block is repairable in decision block 212. If not, the "NO" branch of decision block 212 is taken, the initramfs switches the boot partition and reboots the management system in block 214, and the method returns to decision block 204 where a decision is made as to whether or not the kernel and initramfs were cryptographically verified. If the block is repairable, the "YES" branch of decision block 212 is taken, and the initramfs writes the forward error corrected block back to the target device in block 216, and the method proceeds to block 218. When no block repair is pending and the "NO" branch of decision block 210 is taken, or after the initramfs writes the forward error corrected block back to the target in block 216, the initramfs starts the DM-Verity program and the dmverityd daemon in block 218.

The DM-Verity and dmverityd operate to mount the root file system, to verify the device and block reads from the device in mounting the root file system, and to report block read errors in block 220. A decision is made as to whether or not any block read errors were reported in decision block 222. If so, the "YES" branch of decision block 222 is taken and a firmware update daemon (fwupdated) logs the error if the boot partition has been switched and synchronizes the firmware in block 224, and the method proceeds to block 226 as described below. For example, if the backup firmware image is a duplicate copy of the primary firmware image, the block from the backup firmware image that is associated with the failing block of the primary firmware image is written to the block location of the primary firmware image. In a further example, if the primary firmware image is a current "N" version and the backup firmware image is previous "N–1" version, then a management computer can be informed of the fact that the management system is operating on an older version of the firmware. If no block read errors were reported, the "NO" branch of decision block 222 is taken and the method proceeds to block 226, as described below. At this point in the method, the recovery and repair actions are completed and the operation of the management system is passed to the associated OS.

When the firmware update daemon (fwupdated) logs any errors in block 224, or when no errors were reported and the "NO" branch of decision block 222 is taken, patrol reads are executed in block 226. A decision is made as to whether or not the DM-Verity program detects any block read errors as a result of the patrol reads in decision block 228. If not, the "NO" branch of decision block 228 is taken and the method returns to block 226 where the patrol reads are continued. If the DM-Verity program detects a block read error, the "YES" branch of decision block 228 is taken and the dmverityd logs the block information for the affected block into the recovery mailbox in block 230 and a decision is made as to whether or not the reboot count exceeds a threshold in decision block 232. If not, the "NO" branch of decision block 232 is taken, the dmverityd switches partitions in block 234, the dmverityd reboots the management system in block 236, and the method returns to block 202 where the U-boot loads the kernel and the initramfs. If the reboot count exceeds the threshold, the "YES" branch of decision block 232 is taken, the dmverityd reboots the management system in block 236, and the method returns to block 202 where the U-boot loads the kernel and the initramfs.

Figure 4:
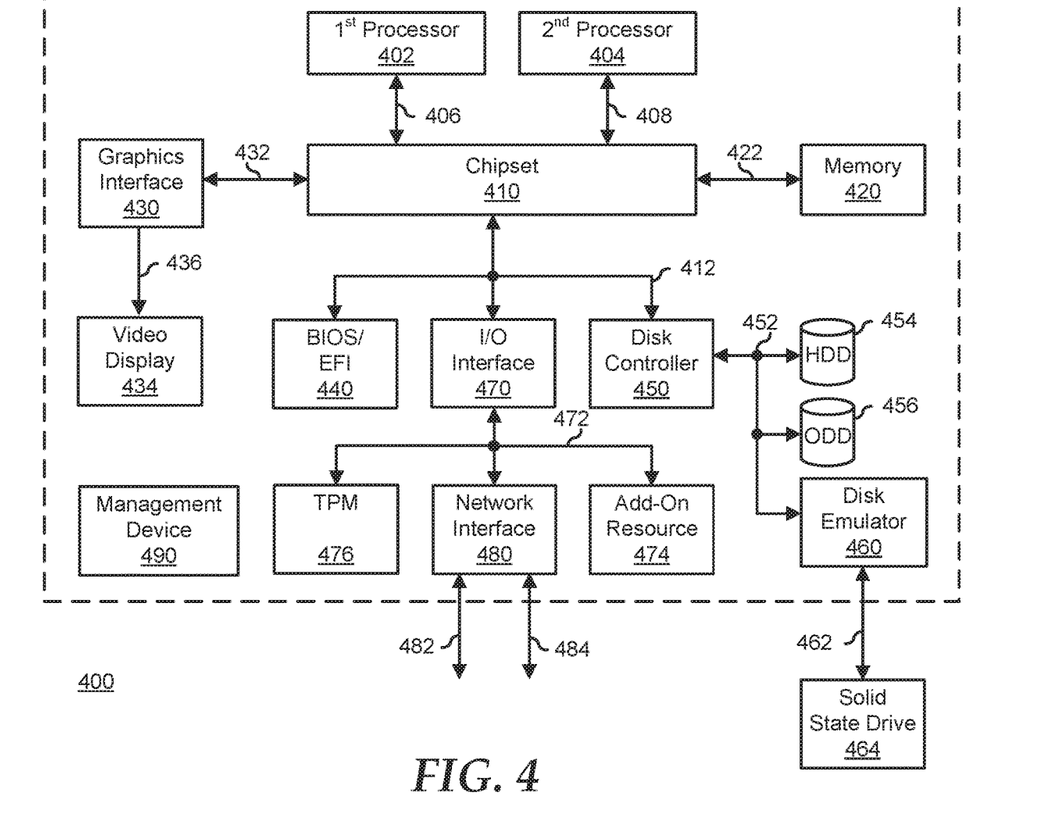
FIG. 4 is a block diagram illustrating an information handling system according to another embodiment of the present disclosure.

FIG. 4 shows an information handling system 400 similar to information handling system 100. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 400 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 400 can include processing resources for executing machine-executable code, such as a central processing unit (CPU), a programmable logic array (PLA), an embedded device such as a System-on-a-Chip (SoC), or other control logic hardware. Information handling system 400 can also include one or more computer-readable medium for storing machine-executable code, such as software or data. Additional components of information handling system 400 can include one or more storage devices that can store machine-executable code, one or more communications ports for communicating with external devices, and various input and output (I/O) devices, such as a keyboard, a mouse, and a video display. Information handling system 400 can also include one or more buses operable to transmit information between the various hardware components.

Information handling system 400 can include devices or modules that embody one or more of the devices or modules described below, and operates to perform one or more of the methods described below. Information handling system 400 includes a processors 402 and 404, a chipset 410, a memory 420, a graphics interface 430, a basic input and output system/universal extensible firmware interface (BIOS/UEFI) module 440, a disk controller 450, a hard disk drive (HDD) 454, an optical disk drive (ODD) 456, a disk emulator 460 connected to an external solid state drive (SSD) 462, an input/output (I/O) interface 470, one or more add-on resources 474, a trusted platform module (TPM) 476, a network interface 480, a management device 490, and a power supply 495. Processors 402 and 404, chipset 410, memory 420, graphics interface 430, BIOS/UEFI module 440, disk controller 450, HDD 454, ODD 456, disk emulator 460, SSD 462, I/O interface 470, add-on resources 474, TPM 476, and network interface 480 operate together to provide a host environment of information handling system 400 that operates to provide the data processing functionality of the information handling system. The host environment operates to execute machine-executable code, including platform BIOS/UEFI code, device firmware, operating system code, applications, programs, and the like, to perform the data processing tasks associated with information handling system 400.

In the host environment, processor 402 is connected to chipset 410 via processor interface 406, and processor 404 is connected to the chipset via processor interface 408. Memory 420 is connected to chipset 410 via a memory bus 422. Graphics interface 430 is connected to chipset 410 via a graphics interface 432, and provides a video display output 436 to a video display 434. In a particular embodiment, information handling system 400 includes separate memories that are dedicated to each of processors 402 and 404 via separate memory interfaces. An example of memory 420 includes random access memory (RAM) such as static RAM (SRAM), dynamic RAM (DRAM), non-volatile RAM (NV-RAM), or the like, read only memory (ROM), another type of memory, or a combination thereof.

BIOS/UEFI module 440, disk controller 450, and I/O interface 470 are connected to chipset 410 via an I/O channel 412. An example of I/O channel 412 includes a Peripheral Component Interconnect (PCI) interface, a PCI-Extended (PCI-X) interface, a high speed PCI-Express (PCIe) interface, another industry standard or proprietary communication interface, or a combination thereof. Chipset 410 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/UEFI module 440 includes BIOS/UEFI code operable to detect resources within information handling system 400, to provide drivers for the resources, initialize the resources, and access the resources. BIOS/UEFI module 440 includes code that operates to detect resources within information handling system 400, to provide drivers for the resources, to initialize the resources, and to access the resources.

Disk controller 450 includes a disk interface 452 that connects the disk controller to HDD 454, to ODD 456, and to disk emulator 460. An example of disk interface 452 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 460 permits SSD 464 to be connected to information handling system 400 via an external interface 462. An example of external interface 462 includes a USB interface, an IEEE 1394 (Firewire) interface, a proprietary interface, or a combination thereof. Alternatively, solid-state drive 464 can be disposed within information handling system 400.

I/O interface 470 includes a peripheral interface 472 that connects the I/O interface to add-on resource 474, to TPM 476, and to network interface 480. Peripheral interface 472 can be the same type of interface as I/O channel 412, or can be a different type of interface. As such, I/O interface 470 extends the capacity of I/O channel 412 when peripheral interface 472 and the I/O channel are of the same type, and the I/O interface translates information from a format suitable to the I/O channel to a format suitable to the peripheral channel 472 when they are of a different type. Add-on resource 474 can include a data storage system, an additional graphics interface, a network interface card (NIC), a sound/video processing card, another add-on resource, or a combination thereof. Add-on resource 474 can be on a main circuit board, on separate circuit board or add-in card disposed within information handling system 400, a device that is external to the information handling system, or a combination thereof.

Network interface 480 represents a NIC disposed within information handling system 400, on a main circuit board of the information handling system, integrated onto another component such as chipset 410, in another suitable location, or a combination thereof. Network interface device 480 includes network channels 482 and 484 that provide interfaces to devices that are external to information handling system 400. In a particular embodiment, network channels 482 and 484 are of a different type than peripheral channel 472 and network interface 480 translates information from a format suitable to the peripheral channel to a format suitable to external devices. An example of network channels 482 and 484 includes InfiniBand channels, Fibre Channel channels, Gigabit Ethernet channels, proprietary channel architectures, or a combination thereof. Network channels 482 and 484 can be connected to external network resources (not illustrated). The network resource can include another information handling system, a data storage system, another network, a grid management system, another suitable resource, or a combination thereof.

Management device 490 represents one or more processing devices, such as a dedicated baseboard management controller (BMC) System-on-a-Chip (SoC) device, one or more associated memory devices, one or more network interface devices, a complex programmable logic device (CPLD), and the like, that operate together to provide the management environment for information handling system 400. In particular, management device 490 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 400, such as system cooling fans and power supplies. Management device 490 can include a network connection to an external management system, and the management device can communicate with the management system to report status information for information handling system 400, to receive BIOS/UEFI or system firmware updates, or to perform other task for managing and controlling the operation of information handling system 400. Management device 490 can operate off of a separate power plane from the components of the host environment so that the management device receives power to manage information handling system 400 when the information handling system is otherwise shut down. An example of management device 490 may include a commercially available BMC product that operates in accordance with an Intelligent Platform Management Initiative (IPMI) specification, a Web Services Management (WS-MAN) interface, a Redfish or other Distributed Management Task Force (DMTF) standard, or another managed system standard, such as a Integrated Dell Remote Access Controller (iDRAC), or the like. Management device 490 may further include associated memory devices, logic devices, security devices, or the like, as needed or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A management system for an information handling system, the management system comprising:
    a memory device including a primary firmware image and a backup firmware image; and
    a baseboard management controller configured to:
        read a first block at an offset within the primary firmware image;
        determine that the read of the first block had a first read error;
        determine that the backup firmware image is a duplicate copy of the primary firmware image;
        read a second block at the offset within the backup firmware image in response to determining that the backup firmware image is a duplicate copy of the primary firmware image;
        write the second block at the offset within the primary firmware image; and
        reboot the management system in response to writing the second block at the offset within the primary firmware image, wherein the reboot of the management system includes a read of the second block at the offset within the primary firmware image.

2. The management system of claim 1, wherein the baseboard management controller is further configured to:
    determine that the primary firmware image is a current firmware image and the backup firmware image is a previous firmware image;
    reboot the management system in response to determining that the primary firmware image is a current firmware image and the backup firmware image is a previous firmware image, wherein the reboot of the management system includes a read of the second block at the offset within the backup firmware image; and
    provide an indication to a management computer that the management system is utilizing the backup firmware image in response to rebooting the management system.

3. The management system of claim 1, wherein, in determining that the read of the first block had the first read error, the baseboard management controller is further configured to verify contents of the first block based upon a hash associated with the first block.

4. The management system of claim 1, wherein:
    the baseboard management controller includes a setting to direct a boot of the management system from one of the primary firmware image and the backup firmware image; and
    the baseboard management controller is further configured to change the setting from a first state to a second state in response to determining that the read of the first block had the first read error, wherein rebooting the management system is in further response to changing the setting.

5. The management controller of claim 1, wherein:
    the baseboard management controller includes a non-volatile memory component; and
    the baseboard management controller is further configured to write information to the non-volatile memory component that identifies the first block in response to determining that the read of the first block had the first read error.

6. The management system of claim 5, wherein the write information includes the offset.

7. The management system of claim 1, wherein:
    the first block includes an error-correcting code portion;
    the baseboard management controller is further configured to determine that the first read error is an uncorrectable read error based upon the error-correcting portion, wherein rebooting is in further response to determining that the first read error is the uncorrectable read error.

8. The management system of claim 7, wherein the baseboard management controller is further configured to:
    determine that the first read error is a correctable read error based upon the error-correcting portion;
    correct the first block based upon the error-correcting portion in response to determining that the first read error is the correctable read error; and
    write the corrected first block at the offset within the primary firmware image.

9. The management controller of claim 1, wherein, after a successful boot process of the management system, the baseboard management controller is further configured to:
    periodically read successive blocks of the primary firmware image;
    determine that a read of a particular block had a second read error; and
    write information to a non-volatile memory component of the management controller, wherein the information identifies the particular block in response to determining that the read of the particular block had the second read error.

10. A method for managing firmware for a management system of an information handling system, the method comprising:
    providing, in a memory device of the management system, a primary firmware image and a backup firmware image;
    reading, by a management controller, a first block at an offset within the primary firmware image;
    determining that the read of the first block had a first read error;
    determining that the backup firmware image is a duplicate copy of the primary firmware image;

reading a second block at the offset within the backup firmware image in response to determining that the backup firmware image is a duplicate copy of the primary firmware image;

writing the second block at the offset within the primary firmware image; and rebooting the management system in response to writing the second block at the offset within the primary firmware image, wherein the reboot of the management system includes the read of a second block at the offset within the primary firmware image.

11. The method of claim 10, wherein the method further comprises:

determining that the primary firmware image is a current firmware image and the backup firmware image is a previous firmware image;

rebooting the management system in response to determining that the primary firmware image is a current firmware image and the backup firmware image is a previous firmware image, wherein the reboot of the management system includes a read of the second block at the offset within the backup firmware image; and providing, by the management controller, an indication to a management computer that the management system is utilizing the backup firmware image in response to rebooting the management system.

12. The method of claim 10, wherein, in determining that the read of the first block had the first read error, the method further comprises:

verifying, by the management controller, contents of the first block based upon a hash associated with the first block.

13. The method of claim 10, wherein the management controller includes a setting to direct a boot of the management system from one of the primary firmware image and the backup firmware image, the method further comprising:

changing, by the management controller, the setting from a first state to a second state in response to determining that the read of the first block had the first read error, wherein rebooting the management system is in further response to changing the setting.

14. The method of claim 10, wherein the management controller includes a non-volatile memory component, the method further comprising:

writing, by the management controller, information to the non-volatile memory component that identifies the first block in response to determining that the read of the first block had the first read error, wherein the write information includes the offset.

15. The method of claim 10, wherein the first block includes an error-correcting code portion, the method further comprising:

determining, by the management controller, that the first read error is an uncorrectable read error based upon the error-correcting portion, wherein rebooting is in further response to determining that the first read error is the uncorrectable read error.

16. The method of claim 15, further comprising:

determining, by the management controller, that the first read error is a correctable read error based upon the error-correcting portion;

correcting, by the management controller, the first block based upon the error-correcting portion in response to determining that the first read error is the correctable read error; and writing, by the management controller, the corrected first block at the offset within the primary firmware image.

17. The method of claim 10, wherein, after a successful boot process of the management system, the method further comprises:

periodically reading, by the management controller, successive blocks of the primary firmware image;

determining, by the management controller, that a read of a particular block had a second read error; and writing, by the management controller, information to a non-volatile memory component of the management controller, wherein the information identifies the particular block in response to determining that the read of the particular block had the second read error.

18. An information handling system, comprising:

a host system having a processor to execute host firmware; and a management system including:

a memory device including a primary firmware image and a backup firmware image; and a baseboard management controller configured to:

boot the management system, wherein the boot of the management system includes a read of a first block at an offset within the primary firmware image, wherein the first block includes an error-correcting portion;

determine that the read of the first block had a first read error; and write the corrected first block at the offset within the primary firmware image;

wherein, after a successful boot process of the management system, the baseboard management controller is further configured to:

periodically read successive blocks of the primary firmware image;

determine that a read of a particular block had a second read error; and write information to a non-volatile memory component of the management controller, wherein the information identifies the particular block in response to determining that the read of the particular block had the second read error.

* * * * *